United States Patent
Charas

Patent Number: 5,991,630
Date of Patent: Nov. 23, 1999

[54] DYNAMIC CHANNEL ALLOCATION FOR SECTORIZED RADIO ACCESS UNITS OF A MOBILE COMMUNICATION SYSTEM

[75] Inventor: Philippe Charas, Upplands Väsby, Sweden

[73] Assignee: Telefonaktiebolaget LM Ericsson, Stockholm, Sweden

[21] Appl. No.: 08/836,578

[22] PCT Filed: Nov. 14, 1995

[86] PCT No.: PCT/EP95/04509

§ 371 Date: May 14, 1997

§ 102(e) Date: May 14, 1997

[87] PCT Pub. No.: WO96/15642

PCT Pub. Date: May 23, 1996

[30] Foreign Application Priority Data

Nov. 15, 1994 [EP] European Pat. Off. ............... 94203335

[51] Int. Cl.⁶ .................................................. H04B 7/00
[52] U.S. Cl. ............................................ 455/452; 455/447
[58] Field of Search .................................... 455/452, 445, 455/446, 524, 562, 447, 448, 449

[56] References Cited

U.S. PATENT DOCUMENTS

| | | |
|---|---|---|
| 4,144,496 | 3/1979 | Cunningham et al. ................. 455/447 |
| 5,257,398 | 10/1993 | Schaeffer ................................. 455/452 |
| 5,276,730 | 1/1994 | Cimiti, Jr. et al. ...................... 455/452 |
| 5,276,907 | 1/1994 | Meidan .................................... 455/452 |
| 5,475,864 | 12/1995 | Hamabe .................................. 455/452 |

*Primary Examiner*—Edward F. Urban
*Assistant Examiner*—Thuan T. Nguyen
*Attorney, Agent, or Firm*—Burns, Doane, Swecker & Mathis, L.L.P.

[57] ABSTRACT

A radio access unit for establishing radio link connections with a plurality of geographically spread remote telecommunication units. The radio access unit comprises radio access modules and antenna means (46), operatively connected to provide a plurality of common radio communication channels in directionally separated transmission sectors (66–71). The radio access modules are arranged for adaptively selecting a free communication channel amongst the plurality of common radio channels in a transmission sector (66–71); i.e. Dynamic Channel Allocation (DCA). The selected channel is individual to a radio link connection in such transmission sector (66–71). The radio access unit can be used in Radio in the Local Loop (RLL) applications and cellular overlay multicell mobile communication networks.

21 Claims, 6 Drawing Sheets

DYNAMIC CHANNEL ALLOCATION FOR SECTORIZED RADIO ACCESS UNITS OF A MOBILE COMMUNICATION SYSTEM

FIELD OF THE INVENTION

The present invention relates generally to telecommunication systems comprising a radio link connection between two or more telecommunication units and, more specifically, to telecommunication systems having a plurality of geographically spread fixed and/or mobile radio telecommunication units.

BACKGROUND OF THE INVENTION

In conventional Public Switch Telephone Networks (PSTN) and Integrated Services Digital Networks (ISDN), for example, up till now the overwhelming majority of residential and office subscribers have a wired connection from the subscriber premises to a public local exchange. These subscriber connections, which may run via an intermediate concentrator, are referred to as the local loop.

The installation of such wired links all the way to the subscriber premises is both time consuming and involves substantial networking costs, apart from troubles caused by the interruption of streets and pavements. Therefore, there is a growing interest in replacing the wired local loop by a so-called wireless local loop, i.e. using radio technology as an alternative for or as a replacement of the copper wires down to the subscriber premises. This is not only of interest for the present network operators in case of expansion or renovation of the existing public telecommunication network but, in particular, for new operators which would like to provide competitive public telecommunication services, such as a public telephone service. The concept of wireless public subscriber connections is called Radio in the Local Loop (RLL).

Within the concept of RLL, two basic systems can be distinguished: Fixed RLL (FRLL) and Mobile RLL (MRLL). In the FRLL system, the subscriber is provided with an ordinary telephone socket, however connected to a radio transceiver, also called Fixed Access Unit (FAU) or Wireless Fixed Access Unit (WFAU). Via this FAU/WFAU a radio link is established with a so-called radio access unit, which provides access to the PSTN/ISDN. In the MRLL concept, the subscriber is provided with a portable cordless or mobile radio telephone handset, by which, via the radio access unit, direct access to the PSTN/ISDN can be established.

Mixed concepts are also possible, i.e. FRLL providing mobility in the subscriber premises, also called Cordless In The Home (CITH) and residential or neighbourhood mobility, also called Cordless In The Neighbourhood (CITN). In some countries, governmental regulations prevent the established telephone operators from offering local mobility in the present PSTN/ISDN. In such cases, it is very advantageous for a second or third operator to offer both fixed and mobile or cordless access to the PSTN/ISDN.

Other types of communication systems having wired connections to a PSTN/ISDN are the well-known cellular mobile telephone and data transmission systems. A typical cellular mobile communication system comprises mobile radio subscriber units, a plurality of radio base stations, each providing service to a geographical area or cell, and radio exchanges or mobile telephone switching offices (MTSO) to which a number of base stations are connected. The MTSO are in turn coupled to a PSTN/ISDN for completing transmissions, such as telephone calls, between mobile radio subscribers and landline subscribers.

Cellular systems provide coverage over relatively wide areas, i.e. relatively large cells. Analogue cellular systems, such as designated AMPS, ETACS, NMT-450 and NMT-900 have been deployed throughout the world. Digital cellular systems are designated IS-54B in North America and the pan-European GSM system. These systems, and others, are described, for example, in the book titled "Cellular Radio Systems", by Balston et al., published by Artech House, Norwood, Mass., 1993.

First generation cellular mobile networks provide service to macrocells, having a range of 1 to 5 km from the base station to the cell boundary, and large cells (5 to 35 km), with some satellite cells (>500 km). An important problem in wireless cellular communication is to provide full coverage cost effectively. This has lead to the splitting of cells in dense traffic areas, adding microcells (10 to 400 m for pedestrians and 300 m to 2 km for vehicles) and minicells (500 m to 3 km) overlaid by a macrocell structure. The overlaying macrocells serve low-traffic areas and address cell crossings by mobile subscribers.

Future cellular mobile networks will also have picocells (a few meters) and nanocells (up to 10 m), often in clusters of street microcells, with each cluster overlaid by a macrocell. In a typical cell overlay configuration, each microcell has its own base station providing service to the corresponding cell, whereas the several base stations are wired to a concentrator or access unit which is in turn coupled to a MTSO. In particular in a picocell and nanocell environment these wired links or loops involve substantial networking costs, not contributing to the object of providing cost effective cellular mobile coverage.

Accordingly, in such cellular overlay mobile networks it would be advantageous to replace the wired links between the several base stations of micro-, nano- and picocells and the corresponding access unit by wireless links, hereinafter referred to as wireless multicell links (WML).

The advantages of wireless local loop connections in the PSTN/ISDN and wireless multicell links in a cellular mobile network are numerous, ranging from short installation times, increased flexibility and improved operation and maintenance of the network to the opportunity of providing local subscriber mobility to the PSTN/ISDN. international Patent Application WO 94/19877 discloses a RLL system based on the existing business cordless technology, such as designated CT2, CT3 and Digital Eurocean Cordless Telecommunications (DECT), now called Digital Enhanced Cordless Telecommunications (DECT).

These very low power, high communication capacity systems consist of a plurality of geographically spread radio access units or base stations. Each radio access unit comprises a radio access module having radio transceiver means and antenna means providing a plurality of radio communication channels to remote telecommunication units in a cell. The various radio access units are connected to a radio exchange, which is in turn coupled to a private or public telecommunication network. Each radio access module is further provided with control means arranged to co-operate with the remote telecommunication units for adaptively selecting a free communication channel which, when occupied, is individual to a radio link connection between the radio access unit and a particular remote telecommunication unit. This type of access technique is known as Dynamic Channel Allocation (DCA).

These cordless communication systems have been developed for use in pico-, nano- and microcell applications. In order to cover extensive residential or metropolitan areas, a very large number of access units or base stations have to be installed and maintained. The building of an infrastructure for the installation and interconnection of such a large number of access units can be rather costly.

A paper by I.Brodie, titled "Performance of Dynamic Channel Assignment Techniques in a Cellular Environment", 1992 IEEE International Conference on Selected Topics in Wireless Communication", Jun. 25–26 1992 Vancouver, B.C., Canada, discloses a radio access unit or base station for establishing radio link connection with a plurality of geographically spread remote telecommunication units in a cell of a cellular mobile radio communication system. The radio access unit comprises transceiver and control means and antenna means for establishing radio link connections in accordance with the DCA type of access technique described above. The transceiver and control means and antenna means are arranged to transmit in directionally separate geographical transmission sectors and are positioned such that a resulting omnidirectional (360°) coverage is obtained.

This known access unit is arranged such that a plurality of common radio communication channels is available for each of the sectors. However, as described by Brodie, no radio communication channel may be used twice on the same radio access unit even in different sectors. Accordingly, the maximum number of radio communication channels available for radio communication in a cell is limited to the plurality of common radio communication channels available to the radio access unit or base station of the cell.

It will be understood that a large amount of control equipment and processing is needed in order to operate a RLL system or WML in a pico-, nano- or microcell overlay mobile network with an access unit such as disclosed by Brodie. In particular if more than one access unit provides coverage to a particular sector. Further, not all of the potential communication channels of the system can be made available at each access unit and transmission sector, with the result that the overall traffic handling capacity is not as efficient as required to provide a viable RLL system or WML in a cellular mobile network system for use in residential and metropolitan areas.

An essential requirement for RLL and WML cellular mobile network systems is, however, enabling installations which are economic as to capacity and power. That is to say, the various components of the system have to be designed such that an optimum between geographical coverage, range, communication capacity and installation costs can be achieved, in order to provide competitive wireless connections.

SUMMARY OF THE INVENTION

In view of the foregoing background, with regard to the optimization of capacity and power, the radio access structure and in particular the radio access units are critical elements to provide a viable RLL system or WML in a pico-, nano- and microcell overlay cellular mobile network.

Accordingly, it is an object of the present invention to provide a radio access unit for establishing radio link connections with a plurality of geographically spread remote telecommunication units, in particular remote telecommunication units of a RLL system or a multicell overlay cellular mobile communication system It is also an object of the present invention to provide a RLL system, using the radio access unit of the invention.

It is a further object of the present invention to provide a cellular mobile telecommunication system, using the radio access unit of the present invention.

In a first embodiment, the invention provides a radio access unit for establishing radio link connections with a plurality of geographically spread remote telecommunication units, the radio access unit comprising transceiver and control means and antenna means operatively connected to provide a plurality of common radio communication channels in directionally separated transmission sectors, the radio transceiver and control means and antenna means are arranged to co-operate with the remote telecommunication units in a transmission sector for adaptively selecting a free radio communication channel of the plurality of common radio communication channels, wherein the radio transceiver and control means and antenna means are arranged to select in each of the transmission sectors a free radio communication channel of the plurality of common radio communication channels, which radio communication channel, when selected, can be reused in the same radio access unit but is individual to a radio link connection in a transmission sector.

The invention is based on the insight that optimization as to capacity and power can be achieved through the combined measures of sectorizing and dynamic channel access (DCA)

By sectorizing, the effective range of a radio link connection can be extended. That is to say, by radiating the RF power of a transmittter means into a directionally limited geographical are, the effective range of the radio transmitter can be extended compared to omnidirectional coverage. By reciprocity, the same holds for the reception sensitivity of the receiver means. Further, by using DCA as the channel access technique for each remote telecommunication unit and radio access module in a given sector, all the common radio communication channels of the system can be reused from sector to sector, without the basic need for a channel or frequency planning. This, because the DCA algorithm automatically prevents the seizure of already occupied communication channels of a sector or a cell.

Accordingly, with the access unit of the present invention a RLL system can be build by installing a relatively small number of access unit compared to the system proposed by WO 94/19877, though increasing the communication capacity compared to the access unit disclosed by Brodie.

By using the access unit of the present invention in a cellular mobile network for providing wireless connections between several small cell base stations and a concentrator or MTSO, a very flexible, economic, and high traffic handling system can be obtained.

In a practical embodiment of the invention, the radio access unit comprises a number of radio access modules, each having radio transceiver means and control means arranged to provide a plurality of common radio communication channels. The access modules are operatively connected to the antenna means for providing the common radio communication channels to the separate transmission sectors. The various radio access modules may operate independently from each other, without any need for control equipment or the like.

Accordingly, the radio access unit of the invention can be advantageously assembled of independently operating access units or base stations designed for operation under the existing business cordless technologies, such as CT2 or DECT, both of which use DCA as their channel access technique. It will be ,understood that the access unit is not limited to the use of this type of radio access modules. Other technologies providing communication channels under the control of a DCA algorithm may be also used.

By a suitable positioning of the different radio access modules, omnidirectional coverage of an area or (overlay) cell can be achieved, such that in each (overlay) cell and all its adjacent cells, all the common radio communication channels of the system are potentially available for establishing a radio link connection.

It is important to notice that, from a system point of view, an omnidirectional radio access unit according to the invention assembled of radio access modules operating in accordance with one of the present business cordless technologies using DCA as their channel access technique, operates itself identical to a single omnidirectional radio access unit or base station of such business cordless technology, however providing extended coverage and communication handling capacity.

As mentioned above, the DCA algorithm occupies only free channels in a given geographical area. A required amount of redundancy, both for repair and maintenance purposes and to account for an increase in the communication capacity for a given sector, can be easily achieved in a further embodiment of the invention, by providing the common radio communication channels in a given sector by at least two radio access modules of the unit, which radio access modules may operate simultaneously during normal operation.

Although two or more access modules can be assigned to the same sector, in a yet further embodiment of the invention the antenna means are designed for overlapping sectorized coverage.

In a preferred embodiment of the invention, the antenna means comprise an arrangement of individual antennas, operatively connected to the radio transceiver means of a separate radio access module.

In order to provide as less as interference between the several radio access modules of the radio access unit, the antennas are preferably of a so-called isolated type, having minimal side and backward radiation properties.

To this end, array antennas of the type having a plurality of radiating elements, each comprising a conductive patch radiator above a conductive substrate, providing a microstrip antenna having a radiating front side and a non-radiating or shielded back side, have proven to be very suitable.

In the preferred embodiment of the invention, the antenna means comprise a hexagonal arrangement of substantially 120° radiating microstrip antennas.

To provide for so-called switch diversity, in order to select a more proper propagation path in case of interferences, in a yet further embodiment of the invention the transceiver means of each radio access module comprise switch means for operatively connecting the transceiver means to a first or second antenna arrangement.

In order to prevent interferences while communication between the access unit and a remote telecommunication is established and in progress, the access unit according to the invention operates preferably using an improved DCA technique, called Continuous Dynamic Channel Selection (CDCS). The basic property of CDCS is that a radio communication channel is selected which is least interfered at the moment of its selection.

Accordingly in a further embodiment of the invention, the control means of the radio access modules are arranged to co-operate with the remote telecommunication units in the associated transmission sector for continuously adaptively selecting a free communication channel amongst the plurality of common communication channel of the system. The radio access modules and remote telecommunication units preferably comprise transceiver means, arranged to provide a plurality of communication channels based on a multiple access technique, such as Time Division Multiple Access (TDMA), Frequency Division Multiple Access (FDMA) and Code Division Multiple Access (CDMA), for example.

In the preferred embodiment of the invention, the radio access modules and the remote telecommunication units coerate in accordance with the Digital Enhanced Cordless Telecommunications (DECT) standard.

A more elaborated discussion on DCA and CDCS can be four. in U.S. Pat. Nos. 4,628,152; 4,731,812 and a paper by D. Akerberg, "Novel Radio Access Principles Useful for the Third Generation Mobile Radio Systems", The Third IEEI International Symposium on Personal, Indoor and Mobile Radio Communication, Boston Mass., Oct. 19–21, 1992, which are included here by reference.

In a constructional embodiment, the radio access unit of the invention comprises a frame having parallel, longitudinally spaced apart first and second mounting plates and means for mounting the antenna substrates at and between the mounting plates. These mounting means may comprise snap fitting means, wherein the antenna substrates or boards at opposite edges thereof are provided with protrusions and the mounting plates are provided with corresponding openings, such that in the mounted state the protrusions are received in these openings.

In case of mounting of the radio access unit at relatively high buildings, towers or the like, for antenna direction purposes, means for controlling the elevation of the antenna boards are provided. Although these means may comprise (remote controlled) driving means such as motors, gear wheels and the like, in a yet further embodiment of the invention, the mounting plates are provided with a number of radially spaced openings, such that the antenna substrates can be mounted in a tilted manner with respect to the mounting plates.

The invention relates also to a radio in the local loop system, and a cellular mobile network, comprising a plurality of geographically spread radio access units of the invention as described above.

The above-mentioned and other features and advantageous of the invention are illustrated in the following description with reference to the enclosed drawings.

DETAILED DESCRIPTION OF THE EMBODIMENTS

Without the intention of a limitation, the invention will now be described and illustrated with reference to an exemplary embodiment.

Figure 1:
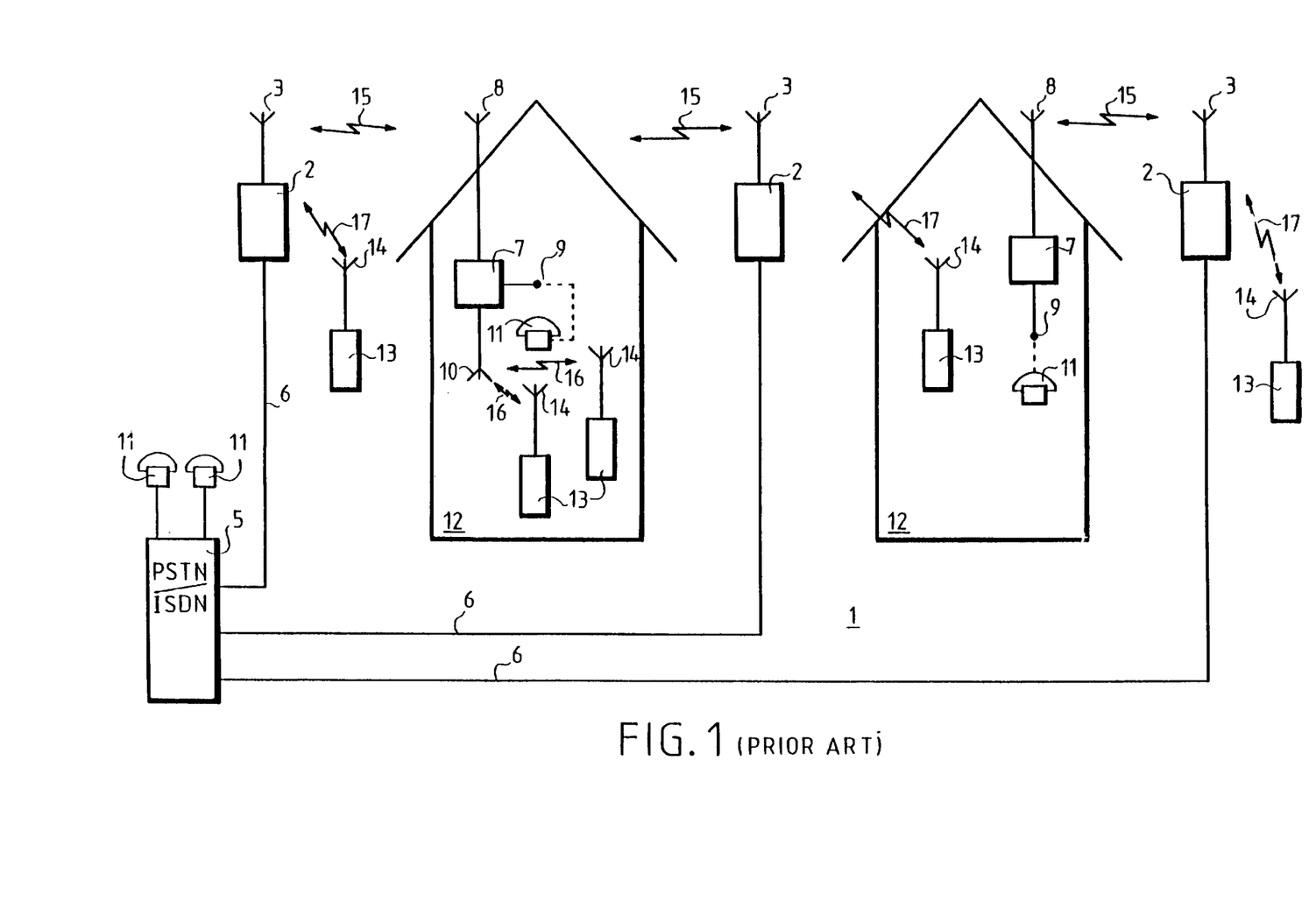
FIG. 1 shows, in a very schematic manner, a prior art RLL system providing both FRLL and MRLL.

FIG. 1 shows an example of a RLL telecommunication system providing fixed (FRLL) and mobile (MRLL) access, such as disclosed by International Patent Application WO 94/19877. The system is generally designated with reference numeral 1 and comprises a plurality of radio access units or base stations 2, each comprising a radio transceiver unit, the transceiver output of which is connected to a receive/transmit antenna 3. The base stations 2 are further coupled to an exchange or switch 5, for connection to a public telephone and/or data network (PSTN/ISDN). Although the connections to the exchange 5 are shown in the form of a cable 6, i.e. a copper wire or an optical fibre, this may be also a microwave link, for example.

The system further comprises a number of remote wireless fixed access units (W)FAU 7, comprising a radio transceiver unit connected to a receive/transmit antenna 8, for establishing a radio communication link 15 with a base unit 3. The remote units 7 comprise either one or both a telephone terminal 9, for connecting an ordinary wire-type telephone 11 and a further receive/transmit antenna 10. As illustrated, the remote units 7 are fixedly installed in (or at) a building 12, such as a house or the like. The antenna 8 may be an indoor or outdoor antenna, preferably a long range antenna, whereas the further antenna 10 is generally an omnidirectional indoor antenna.

Besides fixedly installed remote units 7, the system comprises also several mobile remote units 13, in the form of telephone handsets, for example. These mobile remote units 13 each comprise a transceiver unit, one end of which is connected to a receive/transmit antenna 14 and another end of which is connected to a microphone/loudspeaker arrangement for voice communication, for example. As illustrated, these mobile remote units 13 can be used inside the building 12, to establish a radio link 16 with the fixed remote units 7, via the indoor antenna 10 and the mobile antenna 14, or for establishing a direct radio link 17 with a base unit 2, via their respective antennas 3 and 14.

In case of base stations 2 operating in accordance with the existing low power cordless technologies such as designated CT2, CT3 and DECT, each of these base stations covers a limited area having the size of a pico-, nano- or microcell. Accordingly, a large number of such base stations 2 have to be installed and connected to the exchange 5 in order to cover extensive residential or metropolitan areas, for example.

Figure 2:
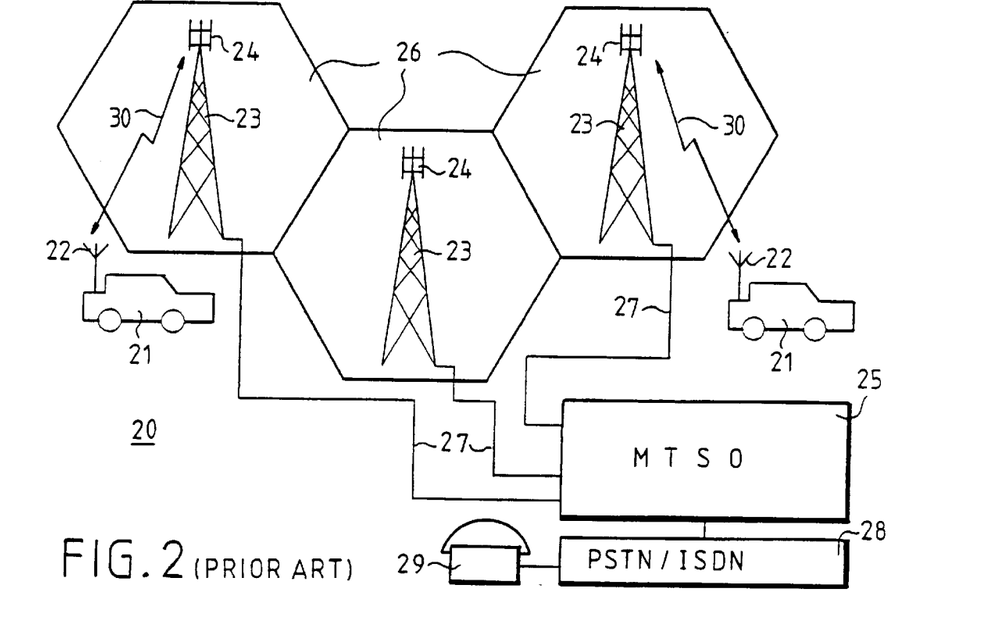
FIG. 2 shows, in a very schematic manner, a typical prior art cellular mobile telecommunication system.

FIG. 2 shows a typical cellular mobile telecommunication system, generally designated with reference numeral 20. The system includes one or more mobile radio stations or units 21, shown in the form of a car, one or more radio base stations 23, illustratively depicted in the from of a tower, and a radio exchange or mobile telephone switching office (MTSO) 25.

Each mobile radio unit 21 comprises a transceiver unit, one end of which is connected to a receive/transmit antenna 22 and another end is connected to a microphone/loudspeaker arrangement for voice communication, for example. Each base station 23 comprises a radio transceiver unit, the transceiver output of which is connected to a receive/transmit antenna 24, and provides service to a cell 26. The radio base stations 23 connect via a wire or cable 27 to the MTSO 25 which connects in turn to a PSTN/ISDN 28 providing service to landline subscribers, represented by a wired telephone 29. Through the cellular network 20, a duplex radio communication link 30 may be effected between two mobile stations 21 or, between a mobile station 21 and a landline subscriber 29.

Although only three cells 26 are shown in FIG. 2, a typical cellular network may comprise hundreds of base stations 23, thousands of mobile stations 21 and more than one MTSO 25. The cells 26 are of the size of a macrocell or a large cell.

Figure 3:
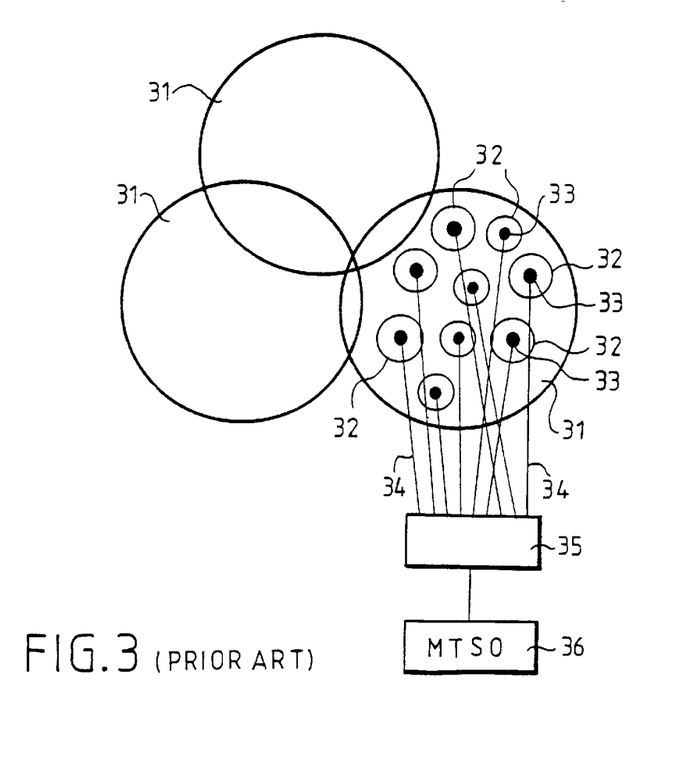
FIG. 3 shows, in a very schematic manner, part of cellular system according to FIG. 2, in which several smaller cells are overlaid by a larger cell.

In order to increase the traffic handling capacity of a cellular mobile network within a given area, it is necessary to decrease the cell size. FIG. 3 shows a typical embodiment of a cellular mobile network, in which a number of relatively small cells 32, such as picocells, nanocells and microcells are contained within or overlaid by a relatively large cell, such as a macrocell 31. For simplicity the various cells are depicted in circular form, whereas just one macrocell is shown comprising several smaller cells.

Each smaller cell 32 comprises a radio access unit 33 providing service to the mobile units 21 in the particular cell (see FIG. 2). The various access units 33 are linked by a cable 34, such as a coaxial cable or copper wires, to a concentrator unit 35 which is in turn coupled to the MTSO 36 of the overlaying macrocell 31. In particular in dense residential or metropolitan areas, a large number of small cells 32 may be required, involving relatively high networking costs owing to the wired connections 34.

Although it is conceivable to replace the wired multicell links 34 by wireless links 15 as shown in FIG. 1, this still does not solve the problem of having to install a large number of base stations 2, to establish a radio link with the various geographically spread radio access units 33 of the cells 32.

A proposed access unit according to the invention, suitable for use in RLL and WML in cellular mobile radio networks providing extended coverage and communication handling capacity, will now be described.

Figure 4:
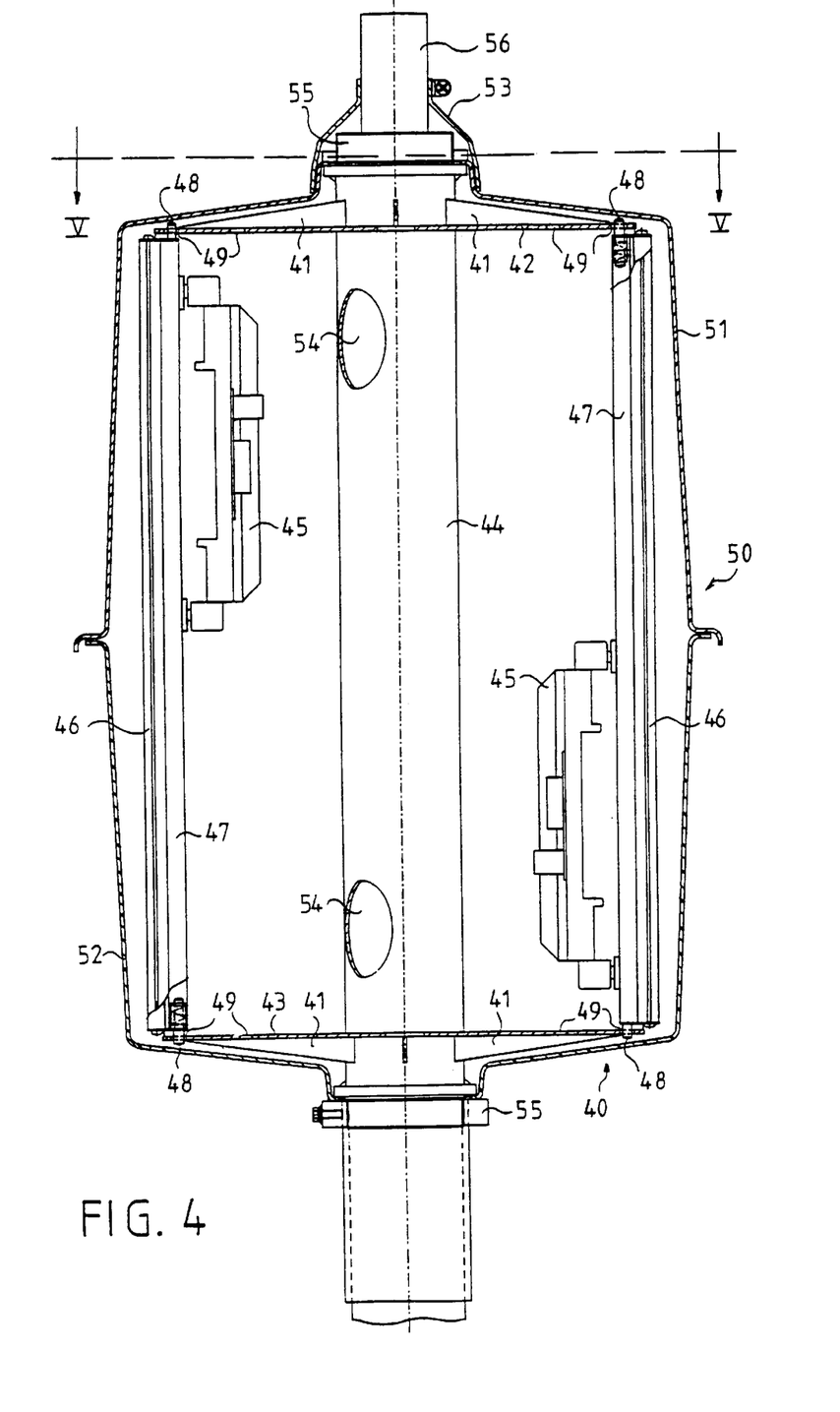
FIG. 4 shows a schematic, partly sectional view of an embodiment of the radio access unit according to the present invention.

Referring first to FIG. 4 there is shown a partly sectional view of the radio access unit 40 according to the present invention. The access unit 40 comprises a longitudinal frame having parallel upper and lower metal mounting plates, 42 respectively 43, having reinforcement fins 41 transverse to the plates 42, 43 which fins 41 are welded or otherwise fixed to an intermediate metal stud or post 44. The post 44 has a concentric relationship with respect to the mounting plates 42, 43. Between the mounting plates 42, 43 at the circumference thereof a number of radio access modules 45 and corresponding antenna boards 46 are arranged. These access modules 45 and antenna boards 46 are mounted at opposite sides of an intermediate longitudinal metal mounting element 47.

At their short sides, the mounting elements are provided with spring loaded protrusions or pins 48. In the mounted state, these pins 48 are received in corresponding openings 49 of the mounting plates 42, 43, by virtue of their spring action. By pushing the pins against the spring force, the mounting elements 47 can be easily released from the frame.

The frame and the mounted radio access modules 45 and antenna boards 46 are covered by a plastic radome 50, consisting of an upper portion 51 and a lower portion 52, as shown. At the upper portion 51 of the radome a closure element 53 is provided, which connects over a hole in the centre of the radome for receiving the post 44, such to prevent moisture from entering the radome 50 via the post 44.

The post 44 generally has the form of a hollow shaft having holes 54 in its boundary wall for receiving connecting cables (not shown) of the radio access modules 45. Via mounting flanges 55 fixed to the upper and lower mounting plates 42, 43 the frame and radome 50 can be fixed to a mast 56 using screws or other clamping means.

Figure 5:
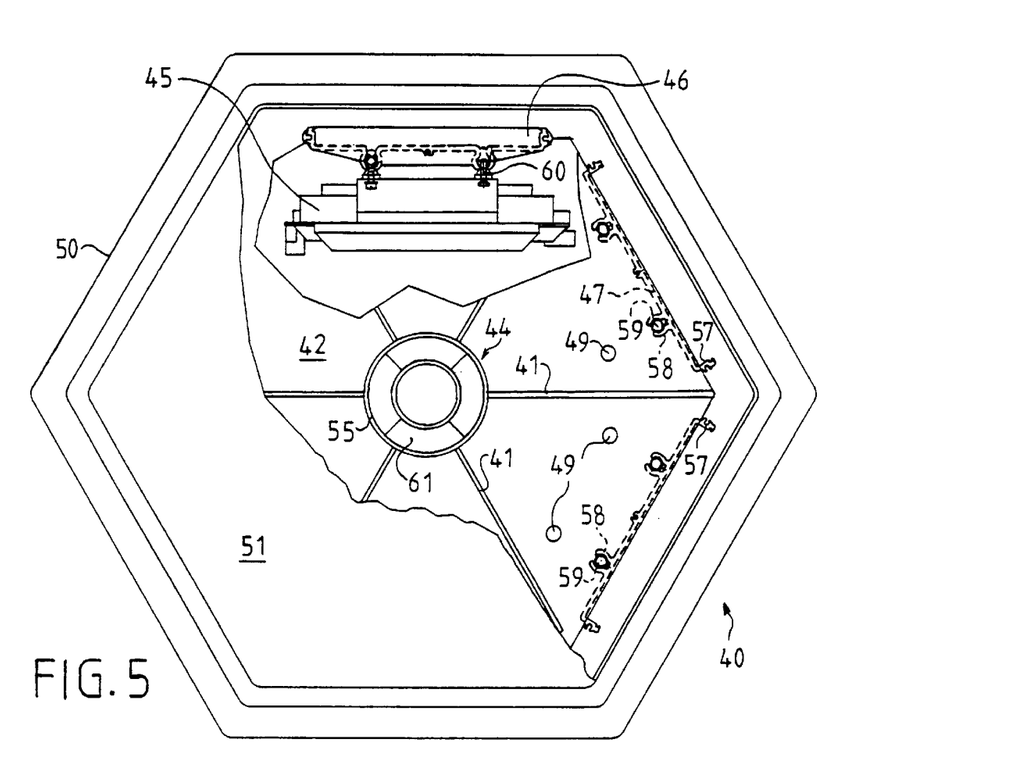
FIG. 5 shows a schematic view from the line V—V of the access unit FIG. 4.

FIG. 5 shows a view from the line V—V of the access unit 40 of FIG. 4, with the upper portion 51 of the radome 50 and the upper mounting plate 42 partly broken away. The mounting elements 47 have a general U-shaped cross sectional front side 57 for receiving the antenna board 46. At their back side 58, the mounting elements 47 are provided with a pair of protrusions 58 for receiving shank like mounting means 59 extending in longitudinal direction of the frame elements 47 for fixing the radio access modules 45. In the embodiment shown, the radio access modules 45 are simply fixed to the mounting means 59 by means of screws 60. The antenna boards 46 may be clamped to the mounting elements 47 or otherwise fixed by means of adhesive or screws, for example (not shown).

As can be seen from FIG. 5, the flanges 55 are designed such to be fit to a mast 56 having an outer diameter which is smaller than the inner diameter of the post 44. The resulting space 61 can be used for receiving connecting cables of the radio access modules 45, i.e. for communication and powering handling (not shown).

By fitting the pins 48 in the corresponding holes 49 positioned closer to the centre of either one of the mounting plates 42, 43 the antenna boards 46 can be arranged in a tilted position with respect to the post 44. This to set an elevation angle for the illumination of a specific region, if required.

Figure 6:
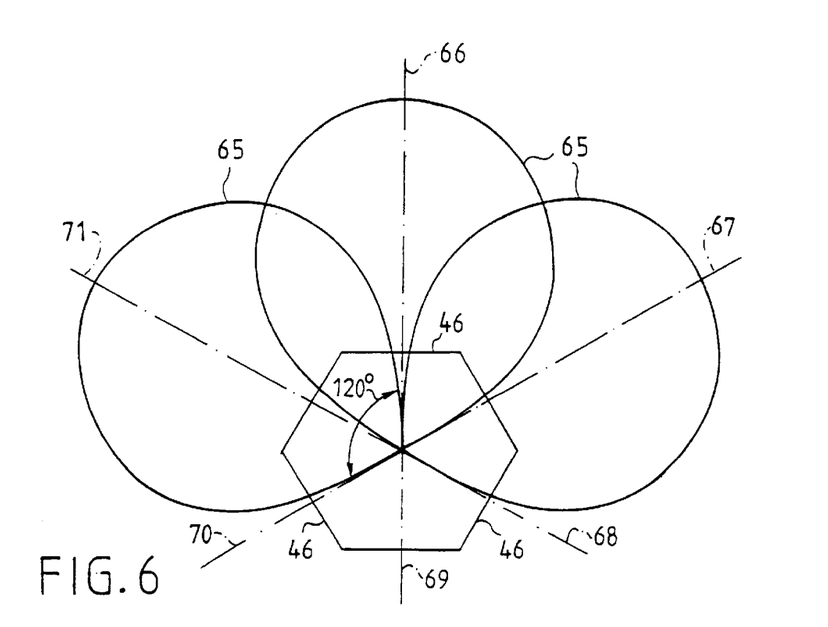
FIG. 6 shows, in a very schematic manner, transmission sectors formed by the radio access unit according to the present invention.

In a preferred embodiment of the access unit according to the invention, the radio access modules 45 and their corresponding antenna boards 46 have a hexagonal arrangement with one antenna board 46 per access module 45, thus providing six transmission sectors 66, 67, 68, 69, 70, 71 as schematically shown in FIG. 6.

The antennas each have a substantially 120° radiation pattern 65. Accordingly, 120° degrees transmission sectors are formed, such that omnidirectional coverage (360°) can be provided by three non adjacent antennas 46, e.g. sectors 66, 68, 70. By adding another 'layer' of 120° antennas, i.e. sectors 67, 69 and 71, overlapping coverage of the adjacent transmission sectors is achieved, thereby providing redundancy.

For simplicity the radiation patterns of only three sectors haven been shown. A skilled person will be understood that even more or less transmission sectors can be formed, dependent on the coverage area and the communication load in such area.

Figure 7:
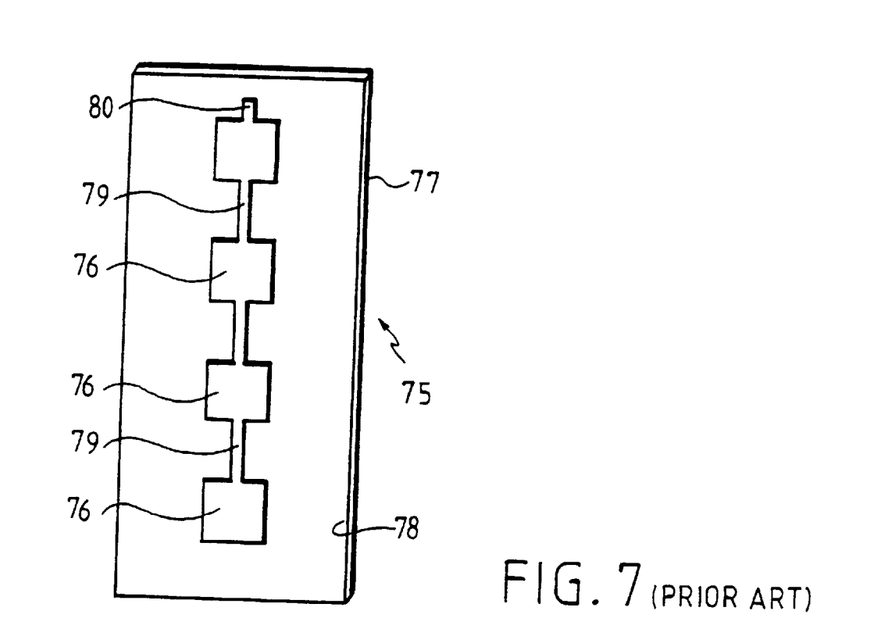
FIG. 7 shows schematically a prior art stripline antenna board used in the radio access unit of FIG. 5.

Microstrip antennas having an array of radiating patches are very suitable for the purpose of the present invention. FIG. 7 shows a prior art microstrip antenna 75, which includes a plurality of conducting patches 76 above a conducting surface 77. The patches 76 are isolated from the surface 77 by a nonconducting intermediate layer 78. The patches 76 are series connected by striplines 79 and form radiating antenna dipoles. At the top of the antenna 75 an antenna terminal 80 is formed, for connecting the patches to the RF transceiver terminal of a radio access module. The conducting surface 77 has to be connected to a ground terminal of the transceiver, and forms a non-radiating or isolated or shielded back-side.

The microstrip antenna 75 has a very low radiation to its back side and edges, such that these antennas can be arranged in a hexagonal shape, for example, with no or virtually no coupling of RF energy between adjacent antennas. The leakage of RF energy to adjacent antennas is less than 60 dB, even without additional measures such as adding RF resistive material between adjacent antennas. Accordingly, cross-modulation effects between adjacent radio access modules are negligible when using these microstrip antennas 75. Reference is made to International Patent Application WO94/11958.

As already mentioned in the introductory part to the present invention, the radio access unit according to the invention can be assembled from radio access modules operating in accordance with one of the present business cordless technologies, such as designated CT2, CT3 and DECT, all using DCA for accessing one of a plurality of common radio channels.

Figure 8:
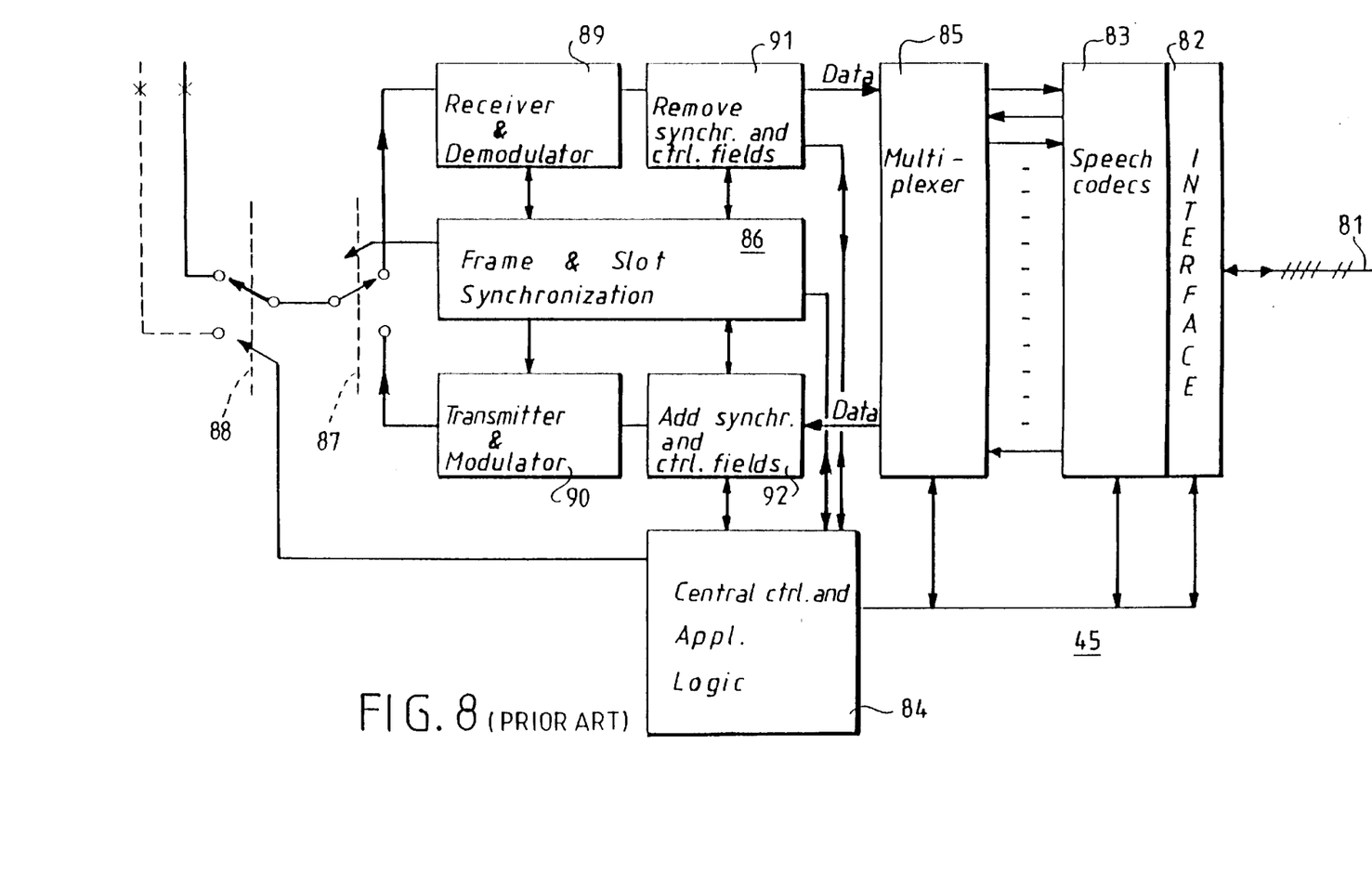
FIG. 8 shows a block diagram of a prior art radio module used in the radio access unit of FIG. 5.

FIG. 8 shows a block diagram of a radio access module 45, which operates in accordance with the DECT standard. In short, DECT is a Multi Carrier/Time Division Multiple Access/Time Division Duplex (MC/TDMA/TDD) digital radio access technique, providing ten radio carriers, each divided into 24 time-slots which serve 12 duplex communication channels, called a frame.

The base station 45 has a wired connection 81 to a local exchange. This is a trunk or a multiline connection for up to 12 simultaneous telephone calls. Via an interface 82 are these calls transcoded into ADPCM formate by speech codecs 83. Central control and application logic 84 detects incoming calls and controls outgoing calls, and selects suitable combinations of carrier and time slots in accordance with the DCA/CDCS algorithm, and merges via a multiplexer 85 the different connections and time slots. The module 45 has a frame and slot synchronization unit 86 which controls slot reception and transmission timing. The central control logic 86 also controls a Transmit/Receive (T/R) switch 87 and an antenna diversity switch 88, if antenna diversity is implemented. With antenna diversity, if a radio connection provides no good communication, the control logic first tries the other antenna before changing the radio communication channel.

The radio interface of the module 45 consists of a receiver/demodulator 89 and a transmitter/modulator 90. Synchronisation and control information is stripped from received data by unit 91, whereas such information is added to the data to be transmitted by unit 92, connected as shown.

In the case of a mobile unit 13 shown in FIG. 1, for example, the line connection 81 terminates in a microphone/loudspeaker arrangement.

In accordance with the present invention, each of the 120 radio channels of the unit 45 are provided to each of the sectors 66–71, shown in FIG. 6. Remote telecommunication units, such as the (W)FAU 7 and the mobile units 13, shown in FIG. 1, or the radio access units 33 of the cellular overlay mobile network shown in FIG. 3 in either one of a transmission sector 66–71 may now, in accordance with the DCA/CDCS technique, select any of these 120 channels for communication purposes, provided such channel is not used by another radio link connection in said sector, whether or not processed via the same radio access module 45. After selection, such channel is individual to the established radio link connection.

Each of the wired connections 81 of the radio modules 45 of the radio access unit according to the invention may be separately connected to the PSTN/ISDN network. However, it is preferred to connect the radio modules to a so-called Node Control Unit (NCU) which act as a traffic concentrator to the PSTN/ISDN network. This NCU may be installed in the access unit itself, for example mounted at the frame of the access unit 40 shown in FIG. 4 or in a separate housing.

In general, the radio access modules shown in FIG. 4 need not necessarily be mounted at or near the antenna boards 46. Like the above-mentioned NCU, these modules may also be installed in a separate housing at the end of the mast 56, for example. Such that the access unit 40 only houses the various antenna boards 46. As will be understood by those skilled in the art, various antennas can be used for the purpose of the present invention.

With the access unit according to the present invention, a RLL system can be provided by simply replacing some of the base stations 2 by a radio access unit 40 according to the invention. Of course, taking into account the extended coverage and capacity of these radio access units. Diversity can be achieved through the installation, near to each other, of several radio access units according to the invention, such that they essentially cover the same region. Instead of complete access units 40 as shown in FIG. 4, it is also conceivable to make clusters of radio access units 40, having access modules 45 as shown in FIG. 8, and access units simply comprising antenna boards 46, as mentioned above. To achieve polarisation diversity, for example, the antenna boards may radiate with different polarisation. In such case, the radio access units may be mounted on the same mast on top of each other in a tandem configuration, for example.

Figure 9:
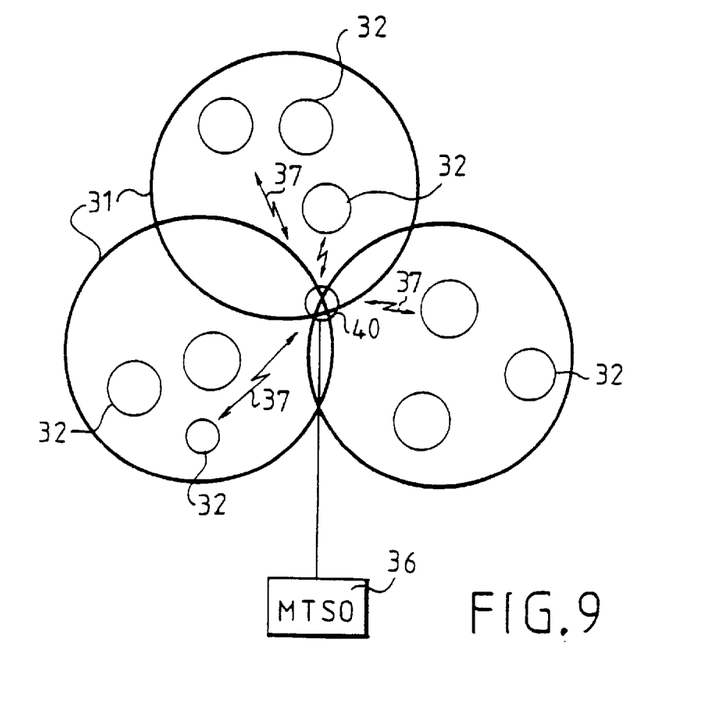
FIG. 9 shows, in a very schematic manner, an application of the radio access unit according to the present invention in a cellular multicell overlay mobile network.

FIG. 9 shows an application of the radio access unit according to the present invention in a multicell cellular overlay mobile network. By positioning the radio access unit 40, for example, at the point of intersection of the macrocells 31, and connecting same with the MTSO 36 of the macrocells 31, a WML 37 with the remote access units 33 of each small cell 32 can be established via the access unit 40. It will be understood that this is a very efficient manner, without the basic need for a channel or frequency planning, of connecting the various small cells, because the traffic generated thereby is generally very low and temporarily, not justifying a wired link 34 as shown in FIG. 3.

The radio access unit according to the present invention provides an excellent tool for the coupling of cellular GSM and DECT wireless systems, for example.

Although the present invention has been described with reference to a specific embodiment and a DECT communication system, it will be understood that the novel idea of the present invention can be used with several access technologies, such as FDMA and CDMA, and many different embodiments of the radio access unit.

We claim:

1. A radio access unit for establishing radio link connections with a plurality of geographically spread remote telecommunication units, said radio access unit comprising transceiver and control means and antenna means operatively connected to provide a common set of radio communication channels for each of a number of directionally separated transmission sectors, said radio transceiver and control means and antenna means are arranged to co-operate with said remote telecommunication units in a transmission sector for adaptively selecting a free radio communication channel from said common set of radio communication channels, wherein said radio transceiver and control means and antenna means are arranged to select in each of said transmission sectors a free radio communication channel from said common set of radio communication channels, wherein a selected radio communication channel can be reused by the radio access unit for a radio link connection in any or all of said directionally separated transmission sectors simultaneously.

2. A radio access unit according to claim 1, comprising a number of radio access modules each having radio transceiver means and control means arranged to provide said common set of radio communication channels, wherein each of said radio access modules are operatively connected to corresponding antenna means to provide said common set of radio communication channels for a corresponding one of said transmission sectors.

3. A radio access unit according to claim 2, wherein said radio access modules are arranged to provide said common set of radio communication channels in a particular transmission sector by at least two radio access modules of said radio access unit.

4. A radio access unit according to claim 3, wherein said antenna means are designed for providing overlapping sectorized coverage.

5. A radio access unit according to claim 2, wherein said antenna means comprise an arrangement of individual antennas, operatively connected to the radio transceiver means of a separate radio access module.

6. A radio access unit according to claim 5, wherein said antennas are of so-called isolated type, having as less as possible side and backward radiation properties.

7. A radio access unit according to claim 5, wherein said individual antennas are comprised of array antennas, each having a substrate and a plurality of radiating elements mounted thereon in a predetermined pattern.

8. A radio access unit according to claim 7, wherein each radiating element comprises a conductive patch radiator above a conductive substrate, providing a microstrip antenna having a radiating front side and a non-radiating or shielded back side.

9. A radio access unit according to claim 8, wherein each of said radio access modules comprises a housing, and is mounted at the non-radiating back side of the corresponding microstrip antenna.

10. A radio access unit according to claim 8, comprising a hexagonal arrangement of substantially 120° radiating microstrip antennas.

11. A radio access unit according to claim 7, comprising a frame having parallel, longitudinally spaced apart first and second mounting plates and means for mounting said antenna substrates at and between said mounting plates.

12. A radio access unit according to claim 11, wherein said mounting means comprise snap fitting means, such that antenna mounting element at opposite edges thereof are provided with protrusions and said mounting plates are provided with corresponding openings, such that in the mounted state said protrusions are received in said openings.

13. A radio access unit according to claim 12, wherein said mounting plates are provided with a number of radially spaced openings such that said antenna substrates can be mounted in a tilted manner with respect to said mounting plates.

14. A radio access unit according to claim 11, further comprising means for controlling the elevation of the antennas.

15. A radio access unit according to claim 2, wherein said antenna means comprise a physically separated first and second antenna arrangement, and wherein the transceiver means of each radio access module comprise switch means for operatively connecting the transceiver means to said first or second antenna arrangement.

16. A radio access unit according to claim 2, wherein the control means of each radio access module is arranged to cooperate with the remote telecommunication units in a corresponding transmission sector for continuously adaptively selecting a free radio communication channel from amongst the common set of radio communication channels.

17. A radio access unit according to claim 2, wherein said radio access modules and remote telecommunication units comprise transceiver means, arranged to provide said common set of communication channels in accordance with a multiple radio access technique.

18. A radio access unit according to claim 17, wherein said radio access modules and said remote telecommunication units operate in accordance with the Digital Enhanced Cordless Telecommunications (DECT) standard.

19. The radio access unit claim 1, wherein the radio access unit and the remote telecommunication units are part of a Radio in the Local Loop based system.

20. A Radio in the Local Loop (RLL) system, comprising a plurality of geographically spread radio access units for establishing radio link connections with a plurality of geographically spread remote telecommunication units, each of said radio access units comprising transceiver and control means and antenna means operatively connected to provide a common set of radio communication channels for each of a corresponding number of directionally separated transmission sectors, said radio transceiver and control means and antenna means are arranged to cooperate with said remote telecommunication units in a transmission sector for adaptively selecting a free radio communication channel from said common set of radio communication channels, wherein said radio transceiver and control means and antenna means are arranged to select in each of said transmission sectors a free radio communication channel from said common set of radio communication channels, wherein a selected radio communication channel can be reused by a radio access unit for a radio link connection in any or all corresponding transmission sectors, said radio access units each being connected via an intermediate radio exchange to a public telecommunication network.

21. A multicell overlay cellular mobile telecommunication network, comprising a plurality of geographically spread radio access units for establishing wireless multicell links (WML) with a plurality of geographically spread remote telecommunication units providing service to a particular cell of said network, each of said radio access units comprising transceiver and control means and antenna means operatively connected to provide a common set of radio communication channels in each of a number of directionally separated transmission sectors, said radio transceiver and control means and antenna means are arranged to cooperate with said remote telecommunication units in a transmission sector for adaptively selecting a free radio communication channel from said common set of radio communication channels, wherein said radio transceiver and control means and antenna means are arranged to select in each of said transmission sectors a free radio communication channel from amongst said common set of radio communication channels, which radio communication channel, when selected, can be reused by a radio access unit for a radio link connection in any or all of the transmission sectors corresponding to the radio access unit simultaneously, said radio access units being connected via an intermediate radio exchange to a public telecommunication network.

* * * * *